Jan. 12, 1960 C. E. LONDON 2,920,901
BOAT TRAILER
Filed April 20, 1959 3 Sheets-Sheet 1
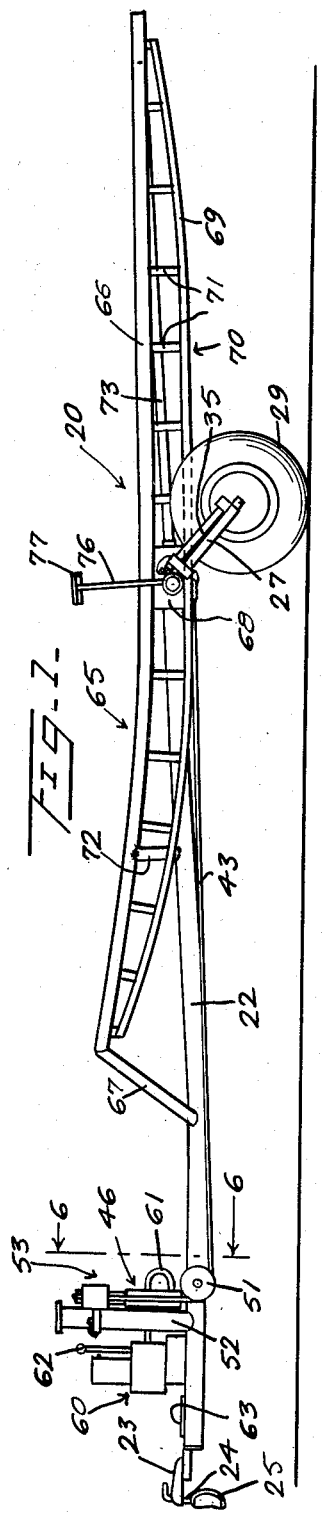
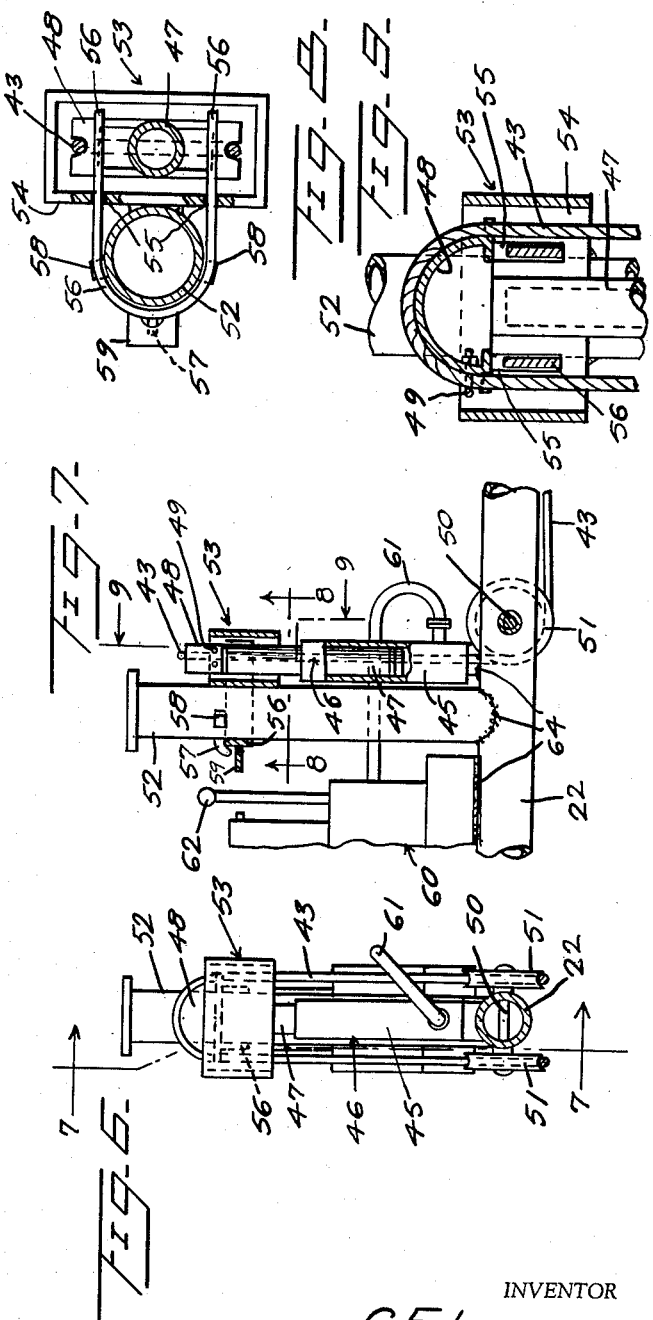
INVENTOR
C.E. LONDON
BY John N. Randolph
ATTORNEY Jan. 12, 1960
C. E. LONDON
2,920,901
BOAT TRAILER
Filed April 20, 1959
3 Sheets-Sheet 2
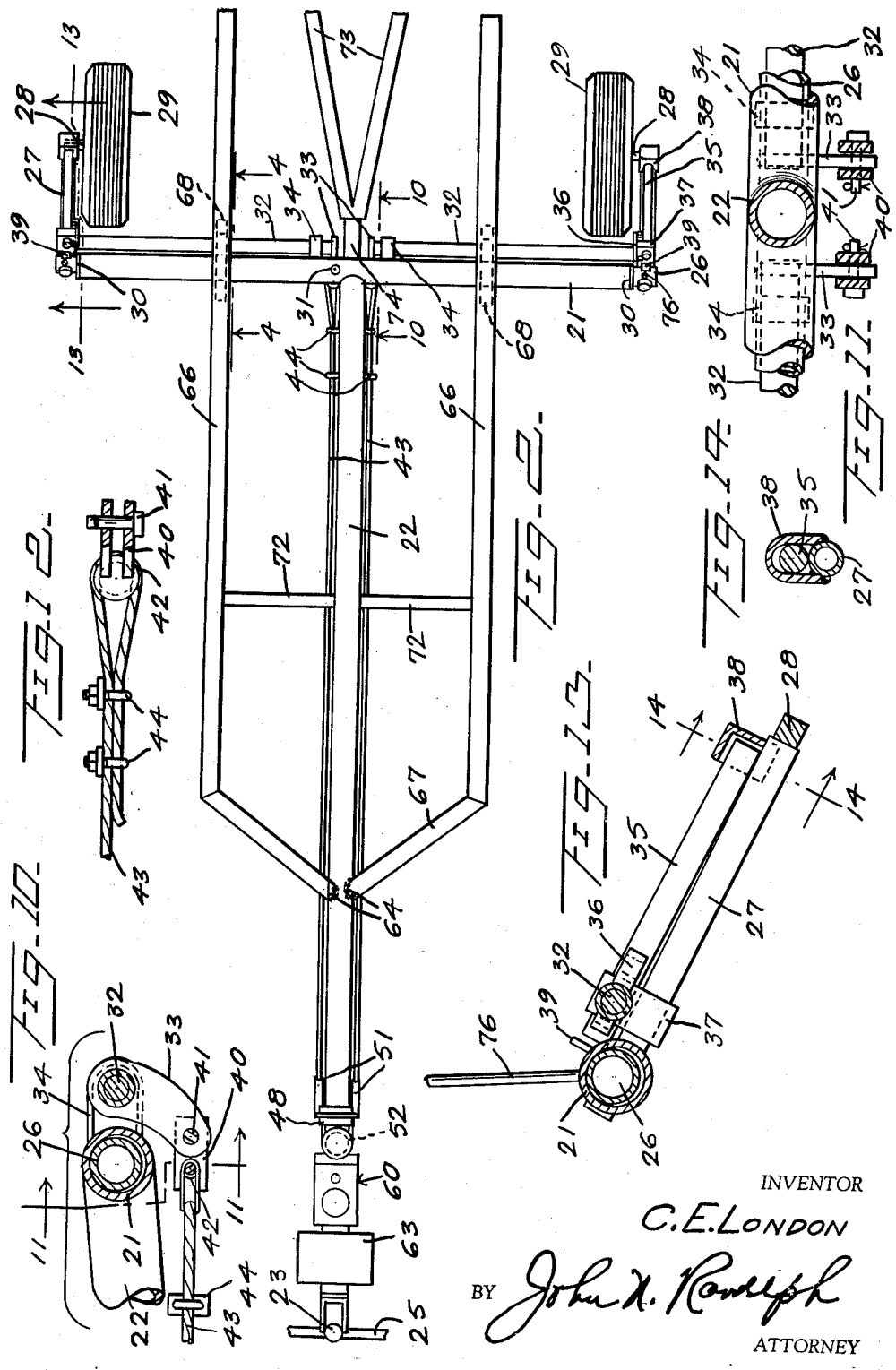
INVENTOR
C.E. LONDON
BY John N. Rowlph
ATTORNEY Jan. 12, 1960     C. E. LONDON     2,920,901
BOAT TRAILER
Filed April 20, 1959     3 Sheets-Sheet 3
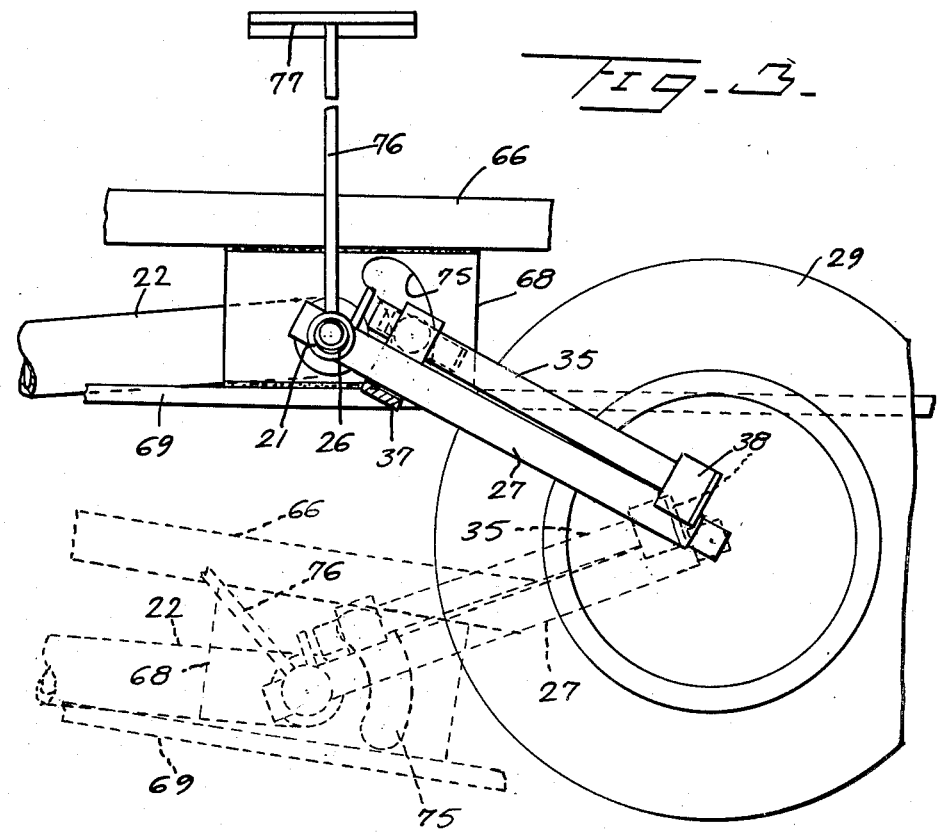
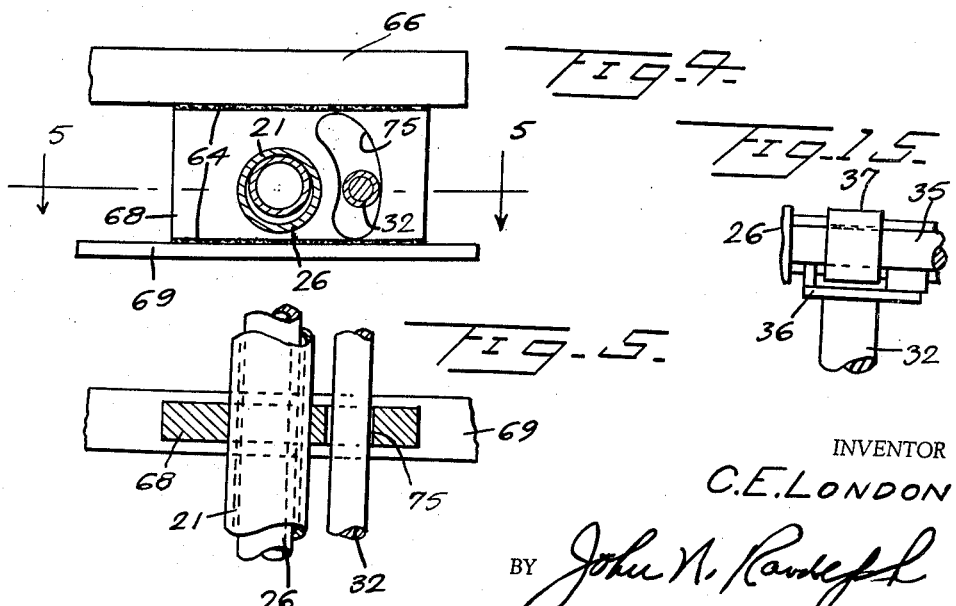
INVENTOR
C.E. LONDON
BY John N. Randolph
ATTORNEY

United States Patent Office 2,920,901
Patented Jan. 12, 1960

2,920,901

BOAT TRAILER

Coy E. London, Corpus Christi, Tex.

Application April 20, 1959, Serial No. 807,495

8 Claims. (Cl. 280—43.19)

This invention relates to a novel boat trailer of extremely simple construction and which is readily adapted for handling boats up to twenty feet or more in length and weighing in excess of two thousand pounds.

More particularly it is an object of the present invention to provide a boat trailer which is extremely stable and which is capable of being raised or lowered as much as two feet to enable the trailer to provide adequate road clearance when elevated and to assume a position with the trailer substantially resting on the ground when lowered.

A further object of the invention is to provide a boat trailer from which boats can be readily launched, when the trailer is driven into the water and lowered, or onto which a boat may be readily loaded, while the trailer is in a lowered position.

Still a further and particularly important object of the present invention is to provide a trailer structure having novel means forming a spring suspension for resiliently supporting the trailer frame or chassis relative to the trailer ground wheels and by means of which the individual ground wheels have a limited swinging motion independently of one another and relative to the frame, in passing over bumps.

A further object of the invention is to provide a novel means for raising and lowering the trailer frame and wherein pressure is applied adjacent the ground wheel axles for raising the trailer frame and for supporting the trailer frame in an elevated position, so that the main axle of the trailer is subjected only to a minimum of torsional forces.

Various other objects and advantages of the invention will hereinafter become more fully apparent from the following description of the drawings, illustrating a presently preferred embodiment thereof, and wherein:

Figure 1 is a side elevational view showing the boat trailer in a normal elevated, load conveying position;

Figure 2 is a somewhat enlarged fragmentary top plan view thereof, with certain of the parts broken away;

Figure 3 is an enlarged fragmentary side elevational view of a part of the boat trailer;

Figure 4 is an enlarged fragmentary vertical sectional view, taken substantially along a plane as indicated by the line 4—4 of Figure 2;

Figure 5 is a fragmentary sectional view taken substantially along a plane as indicated by the line 5—5 of Figure 4;

Figure 6 is an enlarged cross sectional view, taken substantially along a plane as indicated by the line 6—6 of Figure 1;

Figure 7 is a fragmentary side elevational view, partly broken away and partly in vertical section, taken substantially along the line 7—7 of Figure 6;

Figure 8 is an enlarged horizontal sectional view, partly broken away, taken substantially along a plane as indicated by the line 8—8 of Figure 7;

Figure 9 is an enlarged fragmentary vertical sectional view, taken substantially along the line 9—9 of Figure 7;

Figure 10 is an enlarged fragmentary vertical sectional view, taken substantially along a plane as indicated by the line 10—10 of Figure 2;

Figure 11 is a fragmentary transverse vertical sectional view, taken substantially along the line 11—11 of Figure 10;

Figure 12 is a fragmentary plan view, partly in horizontal section, of certain of the parts shown in Figure 10;

Figure 13 is an enlarged fragmentary vertical sectional view, taken substantially along the line 13—13 of Figure 2;

Figure 14 is a fragmentary cross sectional view taken substantially along a plane as indicated by the line 14—14 of Figure 13, and Figure 15 is a detailed fragmentary view on an enlarged scale and showing certain of the parts as disclosed in Figure 13.

Referring more specifically to the drawings, the boat trailer in its entirety is designated generally 20 and includes a rigid pipe or tube of relatively large diameter forming an axle housing 21. One end of a long rigid pipe or tube 22 is secured in any suitable manner, as by welding, to the axle housing 21, midway of the ends of said axle housing. The tube or pipe 22 extends forwardly of the axle housing 21 and constitutes the trailer tongue. The parts 21 and 22 form the trailer chassis. A conventional coupling element 23 is secured to and projects from the forward end of the tongue 22 and is adapted to be detachably coupled to a conventional trailer hitch or coupling element 24. The coupling element 24 may be mounted on any suitable draft vehicle. For example, said coupling element may be secured to a part of a rear bumper 25 of a motor vehicle, as illustrated in Figure 1, and as is conventional.

A strong rigid tube or pipe 26, of slightly smaller external diameter than the internal diameter of the axle housing 21, fits turnably in said axle housing and has end portions projecting beyond the ends thereof. Rigid lever arms 27, which are preferably tubular, have forward ends extending through and secured in the exposed ends of the axle 26. Said lever arms 27 extend rearwardly from the axle ends and are provided with inwardly extending stub axles 28 at their rear ends on which are journaled ground wheels 29, each of which includes a pneumatic tire. Thus, the ground wheels 29 are disposed between the lever arms 27. Suitable seals 30 are mounted on the ends of the axle 26 and abut the ends of the axle housing 21, to prevent moisture entering the axle housing and to retain a lubricant therein, which is supplied to the axle housing through a conventional fitting 31. The seals 30 also prevent any longitudinal sliding movement of the axle 26 in the axle housing 21.

A pair of torsion rods 32 are disposed in spaced apart end-to-end relation to one another behind the axle housing 21, as seen in Figure 2. Cranks 33 are secured, in any suitable manner, as by welding, on the adjacent ends of the torsion rods 32 and extend either downwardly or rearwardly therefrom. Said torsion rods 32, adjacent the cranks 33, are supported by rigid strap members 34 which are secured to and extend rearwardly from the axle housing 21 and in which said torsion rods are loosely disposed for rotational and wabbling movement. As best seen in Figure 15, the outer end of each torsion rod 32 is rigidly secured to a rigid lever arm 35 by a connection 36 which may be welded or otherwise secured to said parts 32 and 35, and for positioning the lever arm 35 crosswise of the torsion rod 32. The connection 36 is located adjacent a forward end of the lever arm 35 and is constructed to straddle a rigid metal strap member 37 which engages loosely around said lever arm 35 and one of the lever arms 27, above which said lever arm 35 is disposed. The lever arms 35 extend longitudinally along the upper sides of the lever arms 27 and have lower free ends fitting loosely in rearwardly opening socket members 38 which are suitably secured, as by welding, to the lever arms 27, adjacent the stub axles 28, and extend upwardly from the lever arms 27, as best seen in Figures 13 and 14. The strap members 37 permit sliding movement of the lever arms 35 longitudinally of the lever arms 27 and also allow a limited swinging movement of the arms 35 relative to the arms 27. Stop plates 39 are secured in and project from the exposed ends of the axle 26 and are located beyond and adjacent the inner or forward ends of the lever arms 35 to limit forward movement of the arms 35 relative to the levers 27 and to retain the rear ends of the lever arms 35 in engagement with the sockets 38.

As best seen in Figures 10 and 11, a clevis 40 is pivotally connected by a pin 41 to the free end of each crank 33. The clevises 40 extend forwardly from the cranks 33 and are each provided with an eye 42 at the forward end thereof. The ends of a wire rope or cable 43 are passed through the clevis eyes 42 and turn back upon themselves and secured to the two reaches of the cable 43 by conventional cable clamps 44.

As best seen in Figures 1, 6 and 7, a cylinder 45 of a hydraulic ram 46 is fixed to and extends upwardly from the tongue 22, near to but spaced from the forward end of said tongue. The ram 46 includes a piston 47 which extends from the upper end of the ram cylinder 45 and which has a head or enlargement 48 at the upper end thereof forming a cable spreader and over which the intermediate portion of the cable 43 extends. A part of the cable 43 is secured by a clamp 49 to the cable spreader 48, as seen in Figure 9, to prevent slippage of the cable or wire rope relative to the cable spreader. The cable spreader 48 is disposed crosswise of the trailer tongue 22 for transversely spacing the two reaches of the cable which extend downwardly from the cable spreader on opposite sides of the ram 46 and tongue 22. As seen in Figures 6 and 7, a shaft or axle 50 extends through and is supported by the tongue 22 rearwardly of but adjacent the ram 46. Pulleys 51 are journaled on the ends of the shaft 50. The two reaches of the wire rope or cable 43 are trained under the pulleys 51 and extend rearwardly therefrom to the clevises 40.

A rigid winch stand or support 52 is secured to and extends upwardly from the tongue 22, in front of and adjacent the ram 46. A hollow rigid guide member 53 is secured to the rear side of the stand 52, above and spaced from the ram cylinder 45, and has an open top and an open bottom, as best seen in Figures 7, 8 and 9. The cable spreader 48 is loosely disposed for vertical sliding movement in the guide 53 and said guide prevents turning of the cable spreader and piston 47 relative to the cylinder 45. An inner wall 54 of the guide 53 is provided with transversely spaced vertically elongated openings 55 which are spaced apart a distance greater than the external diameter of the stand 52, as best seen in Figure 8. A rigid U-shaped supporting member 56 straddles the stand 52 and the legs thereof extend slidably through the openings 55 into the guide 53 to straddle the upper end of the piston 47 and to engage the underside of the cable spreader 48 for supporting the ram piston in an extended position and the cable spreader 48 elevated. The intermediate portion of the supporting member 56, which engages partially around the stand 52, engages under a hook 57 and blocks 58 which are suitably secured to and extend outwardly from the stand 52. Said parts 57 and 58 may likewise be secured by welding to the stand 52. The intermediate portion of the support 56 has an outwardly projecting handle 59 which is disposed beneath and spaced from the hook 57. The openings 55 are of a length greater than the width of the legs of the support 56 so that said support can be rocked relative to the guide 53, when the ram 46 is sufficiently extended so that the spreader 48 is above and out of engagement with the support 56. Thus, the outer or forward part of the support 56 can be rocked downwardly to disengage it from the hook 57 so that said support can be extracted from the guide 53 to permit retraction of the ram 46.

A hydraulic pump and power source 60 of any conventional type is rigidly mounted on the tongue 22, forwardly of the stand 52 and has a conduit 61 leading therefrom and communicating with the lower portion of the ram cylinder 45. The pump 60 is provided with a manually operated control lever 62 for controlling the supply of a hydraulic medium under pressure to the lower end of the ram cylinder or for release of the hydraulic medium therefrom. A step plate 63 is rigidly secured on the tongue 22 in front of the pump 60. The parts 63, 60, 52 and 45 may be connected to the tongue 22 by welding, and said weld connections and the other weld connections, previously referred to and hereafter mentioned, are designated 64.

A boat supporting cradle 65 is fixed to and supported by the chassis or frame 21, 22, and includes two transversely spaced supporting rails 66 which extend longitudinally of the trailer 20 and which have downwardly and inwardly inclined forward ends 67 which are welded or otherwise secured to the trailer tongue 22, behind and adjacent the ram 46. Supporting plates 68, as best seen in Figures 4 and 5, are disposed around and secured to the axle housing 21, on opposite sides of the tongue 22. Intermediate portions of the rails 66 rest on and are welded or otherwise secured to the upper edges of the plates 68. The intermediate portion of a rigid bottom bar 69 of a truss frame 70 is secured, as by welding, to the bottom edge of each plate 68. The bars 69 extend longitudinally beneath the rails 66 and have end portions secured to said rails near the ends thereof. Each truss support 70 additionally includes upright braces 71 which extend between and are secured to the bar 69 and the rails 66, disposed above said bar. The cradle 65 additionally includes downwardly and inwardly inclined braces 72 which extend between and are secured to the rails 66 and tongue 22, and diagonal rear braces 73 having rear ends secured to the rails 66, near the rear ends thereof. Said braces 73 extend forwardly in converging relation to one another and at a downward incline and have forward ends secured to a stub member 74 which is secured to and extends rearwardly from the intermediate portion of the axle housing 21, between the cranks 33, as seen in Figure 2. The plates 68 have large arcuately curved openings 75, as best seen in Figure 4, located behind the axle housing 21 and through which portions of the torsion rods 32 loosely extend.

A rigid rod 76 is shown fixed to and extending upwardly from each exposed end of the axle 26, and said rods have step plates 77 fixed to their upper ends. However, one or both of the step plates 77 and the support 76 thereof may be omitted.

The trailer 20 is shown in Figure 1 and in full lines in Figure 3 in an elevated load conveying position with the axle housing 21 disposed substantially above the level of the stub axles 28. The trailer frame 21, 22 is maintained in this elevated position by the tensioned reaches of the wire rope or cable 43 since the cable spreader 48 is maintained in an elevated position by its engagement on the support 56. To lower the trailer chassis the lever 62 is manipulated to supply hydraulic medium under pressure to the ram cylinder 45 through the conduit 61 to elevate the spreader 48 sufficiently so that the support 56 can be rocked in the openings 55 and disengaged from beneath the hook 57, so that said support 56 can be removed from the guide 53. The lever 62 is then manipulated to allow the hydraulic medium under pressure to return gradually to the pump 60 so that the cable ends can pull the cable spreader 48 downwardly and retract the ram 46 and to allow the cranks 33 to swing rearwardly and upwardly. This permits the torsion rods 32 to turn and wabble in their supports 34 so that pressure, previously exerted by the lever arms 35 on the lever arms 27, adjacent the stub axles 28, is relieved, allowing the lever arms 27 to swing downwardly relative to the wheels 29 about the stub axles 28. When this occurs, the main axle 26 turns in the axle housing 21 and the trailer chassis 21, 22 and cradle 65 swing downwardly to their dotted line positions of Figure 3 with the trailer chassis located in close proximity to the ground level 78. During this downward swinging movement of the lever arms 27 and 35, the torsion rods 32 rotate and swing upwardly in the openings 75 around the axle housing 21, and the step plates 77 and their supports 76 swing downwardly and forwardly.

In the lowered position of the trailer, a boat, not shown, may be readily loaded thereon or unloaded therefrom. This can be particularly well accomplished when the trailer 20 has been backed into the water. Most boats can be floated off of the trailer or positioned to be picked up by the trailer when the trailer is lowered, as heretofore described, in water of approximately one foot depth. The wheels 29 function as guards to prevent the boat from being damaged by striking a rigid part of the trailer during loading and unloading.

To raise the trailer 20, pressure is supplied to the ram 46 to elevate the cable spreader 48, and when the trailer is fully raised, the support member 56 is replaced so that the hydraulic pressure can be released from the ram. In raising the trailer, the reaches of the cable or wire rope 43 exert a forward pull on the cranks 33 for turning the torsion bars 32 to exert a force on the lever arms 35 for swinging said lever arms downwardly. The free ends of the lever arms 35 will bear forcibly on the levers 27, near the wheel axles 28, to lift the trailer relative to the ground wheels 29. Thus, no torque is exerted directly on the main axle 26 for raising or supporting the trailer.

The main axle 26 may be of considerable length, as much as eight feet, since the wheels 29 are disposed inwardly with respect to the axle ends. Thus, the axle 26, due to its length, provides a torsion element capable of yieldably twisting sufficiently to allow either ground wheel 29 to swing upwardly independently to pass over a bump. The torsion rods 32 are also capable of yieldably twisting under such torsional force.

Various modifications and changes are contemplated and may be resorted to, without departing from the function or scope of the invention as hereinafter defined by the appended claims.

I claim as my invention:

1. A trailer vehicle comprising a chassis including an axle housing and a rigid tongue, said tongue being secured to and extending forwardly from an intermediate portion of the axle housing, a main axle extending through and journaled in said axle housing and having end portions protruding from the ends of the axle housing, lever arms fixed to and extending transversely from said axle ends and rearwardly of the trailer, stub axles projecting laterally from the free ends of said lever arms, ground wheels journaled on said stub axles, a pair of torsion rods, means supported by the axle housing and loosely supporting the torsion rods behind the axle housing and in spaced apart end-to-end relation relative to one another, lever members secured to remote ends of said torsion rods and disposed over the lever arms of the axle and having free ends bearing on said lever arms adjacent the stub axles, and a power operated torque imparting means supported by the trailer chassis and connected to adjacent ends of said torsion rods for applying a torque thereto simultaneously in a direction for swinging said lever members downwardly for causing the free ends thereof to bear forcibly upon the lever arms of the axle adjacent said stub axles for causing the trailer chassis to swing upwardly relative to the ground engaging wheels about the axis of said stub axles.

2. A trailer vehicle as in claim 1, said stub axles extending inwardly from said lever arms for mounting the ground wheels between the lever arms, said main axle being of a length whereby it can yieldably twist in response to a torsional force exerted on either end thereof to permit either lever arm and the ground wheel associated therewith to have a limited upward swinging movement relative to the chassis and other ground wheel.

3. A trailer vehicle as in claim 1, and an elongated load supporting cradle secured to and supported by said chassis and having an intermediate portion connected to the axle housing.

4. A trailer vehicle as in claim 1, and an elongated boat supporting cradle fixed to the chassis and disposed longitudinally thereof and having an intermediate portion secured to the axle housing.

5. A trailer vehicle as in claim 1, a coupling member secured to the forward end of the tongue and adapted to be connected to and supported by a draft vehicle coupling element.

6. A trailer vehicle as in claim 1, said power operated torque imparting means including cranks fixed to and extending downwardly from the adjacent ends of said torsion rods, an extensible ram fixed to and supported by a forward part of the tongue, and means connecting the free ends of the cranks to the ram for swinging the cranks forwardly when the ram is extended.

7. A trailer vehicle as in claim 6, said ram being mounted in an upright position on the tongue, said means connecting the cranks and ram comprising a nonelastic flexible member having ends secured to said cranks and an intermediate portion secured to a vertically extensible part of the ram, and guide pulleys supported by and disposed on either side of the tongue beneath said ram and under which portions of the flexible member are trained.

8. A trailer vehicle as in claim 7, a post fixed to and rising from the tongue adjacent said ram, and a supporting member detachably connected to and supported by said post and engaging a part of the ram for maintaining the ram in an extended position.

References Cited in the file of this patent

UNITED STATES PATENTS

| | | |
|---|---|---|
| 2,496,599 | Rivers | Feb. 7, 1950 |
| 2,768,002 | Rabe | Oct. 23, 1956 |
| 2,789,835 | Ashton | Apr. 23, 1957 |
| 2,872,210 | Shaffer | Feb. 3, 1959 |